(12) United States Patent
Yoshinaga et al.

(10) Patent No.: US 12,428,228 B2
(45) Date of Patent: Sep. 30, 2025

(54) FRAME UNIT

(71) Applicant: Daifuku Co., Ltd., Osaka (JP)

(72) Inventors: Kazuharu Yoshinaga, Hinocho (JP); Takashi Akiyama, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 550 days.

(21) Appl. No.: 17/900,177

(22) Filed: Aug. 31, 2022

(65) Prior Publication Data

US 2023/0071673 A1 Mar. 9, 2023

(30) Foreign Application Priority Data

Sep. 6, 2021 (JP) ................................. 2021-144952

(51) Int. Cl.
*B65G 1/10* (2006.01)
*B65G 1/04* (2006.01)

(52) U.S. Cl.
CPC ............. *B65G 1/0492* (2013.01); *B65G 1/10* (2013.01)

(58) Field of Classification Search
None
See application file for complete search history.

(56) References Cited

U.S. PATENT DOCUMENTS

| | | | |
|---|---|---|---|
| 5,174,437 A | 12/1992 | Burger | |
| 6,126,017 A * | 10/2000 | Hours | B07C 3/06 |
| | | | 198/704 |
| 6,208,908 B1 * | 3/2001 | Boyd | G06Q 10/087 |
| | | | 198/704 |
| 9,186,706 B2 * | 11/2015 | Van Haaster | B65G 47/38 |
| 10,336,539 B2 * | 7/2019 | Caveney | B65G 1/06 |
| 11,027,923 B1 * | 6/2021 | Mohammed | B65G 11/081 |
| 11,586,187 B2 * | 2/2023 | Futch | B07C 3/008 |
| 11,872,597 B2 * | 1/2024 | Bombaugh | B65G 47/38 |
| 11,987,448 B2 * | 5/2024 | Yoshinaga | B65G 17/12 |

FOREIGN PATENT DOCUMENTS

| | | | |
|---|---|---|---|
| JP | H257807 U | 4/1990 | |
| JP | H4298407 A | 10/1992 | |
| JP | 620725 Y2 | 5/1993 | |
| JP | H520725 Y2 | 5/1993 | |
| JP | 2007320750 A | 12/2007 | |
| JP | 2008143666 A | 6/2008 | |
| JP | 2016113291 A | 6/2016 | |
| JP | 202083510 A | 6/2020 | |

\* cited by examiner

*Primary Examiner* — Mark C Hageman

(74) *Attorney, Agent, or Firm* — The Webb Law Firm

(57) ABSTRACT

A frame unit includes door members that are provided in correspondence with openings and change in orientation between an open orientation in which the openings are open and a closed orientation in which the openings are closed, and a door drive section that drives the door members in order to cause the door members to change in orientation. The door drive section includes a drive source and a transmission mechanism that transmits driving power from the drive source to the door members.

8 Claims, 8 Drawing Sheets

FRAME UNIT

CROSS REFERENCE TO RELATED APPLICATION

The application claims priority to Japanese Patent Application No. 2021-144952, filed Sep. 6, 2021, the disclosure of which is hereby incorporated by reference in its entirety.

BACKGROUND OF THE INVENTION

1. Field of the Invention

The present invention relates to a frame unit that includes a top plate section, support leg sections that support the top plate section from below, and an article support section that supports an article.

2. Description of the Related Art

As one example, JP H5-020725A (Patent Document 1) discloses a frame unit that includes a transport device for transporting articles in a predetermined direction. In the following, the reference numerals shown in parentheses in the description of related art are the reference numerals used in Patent Document 1.

The frame unit disclosed in Patent Document 1 includes a tray plate (1) for transporting articles in a predetermined direction, a chute plate (2) provided on one side of the tray plate (1), and an opening/closing table (3) that is continuous with the lower end of the chute plate (2). Due to tilting of the tray plate (1), an article transported by the tray plate (1) is discharged to the chute plate (2), slides down the chute plate (2), and is placed on the opening/closing table (3). When the opening/closing table (3) is opened, the article placed on the opening/closing table (3) falls downward and is stored inside a case (5) arranged directly under the opening/closing table (3). The opening/closing table (3) is configured to be opened/closed by driving power from a drive source (17).

The frame unit disclosed in Patent Document 1 includes a plurality of opening/closing tables (3). The tray plate (1) and the chute plate (2) transport articles to each of the opening/closing tables (3) as described above. Each of the opening/closing tables (3) is provided with a drive source (17) for driving that opening/closing table (3). In other words, the frame unit disclosed in Patent Document 1 includes the same number of drive sources (17) as opening/closing tables (3). For this reason, it has conventionally been necessary to secure space for disposing a plurality of drive sources (17), which has been a factor in an increase in the size of the frame unit.

SUMMARY OF THE INVENTION

In view of the above situation, there is desire to reduce the size of the frame unit.

The following is an aspect of technology for solving the above problems.

A frame unit includes:
a top plate section;
a support leg section supporting the top plate section from below; and
an article support section configured to support an article,
wherein the top plate section includes:
a passage area provided with a passage along which an article transport vehicle is travelable, and
a receiving area in which a plurality of receiving sections configured to receive the article from the article transport vehicle are provided,
each of the receiving sections includes an opening that passes through the top plate section in an up-down direction,
the article support section is configured to support, at a position below the top plate section, the article that was received by one of the receiving sections and passed through the opening of the one receiving section,
the frame unit further includes:
a plurality of door members provided in correspondence with the openings, the door members each being configured to change in orientation between an open orientation in which the corresponding opening is open and a closed orientation in which the corresponding opening is closed; and
a door drive section configured to drive the door members in order to cause the door members to change in orientation, and
the door drive section includes a drive source and a transmission mechanism configured to transmit driving power from the drive source to the plurality of door members.

According to this configuration, when a door member is in the closed orientation, the article received by the corresponding receiving section is placed on the door member. For this reason, one or more articles can accumulate on the door member. Then, when the door member changes to the open orientation, the one or more articles placed on the door member pass through the opening and become supported by the article support section. For this reason, the frame unit having this configuration can be suitably used when sorting articles, for example. Also, according to this configuration, a plurality of the door members are provided in correspondence with a plurality of openings, and the door members are driven by the door drive section. The door drive section includes a drive source and a transmission mechanism that transmits driving power from the drive source to the door members, thus making it possible to drive a plurality of door members by one drive source. Therefore, according to this configuration, the number of drive sources can be lower than the number of door members, thus making it possible to commensurately reduce the amount of space required to arrange the drive sources, and reduce the size of the frame unit overall.

Further features and advantages of technology according to the present disclosure will be more apparent from the following description of exemplary and non-limiting embodiments given with reference to the drawings.

DESCRIPTION OF THE INVENTION

Hereinafter, an embodiment of a frame unit will be described by way of example of a case where the frame unit is provided in an article transport facility for sorting and transporting articles.

Overview of Article Transport Facility

Figure 1:
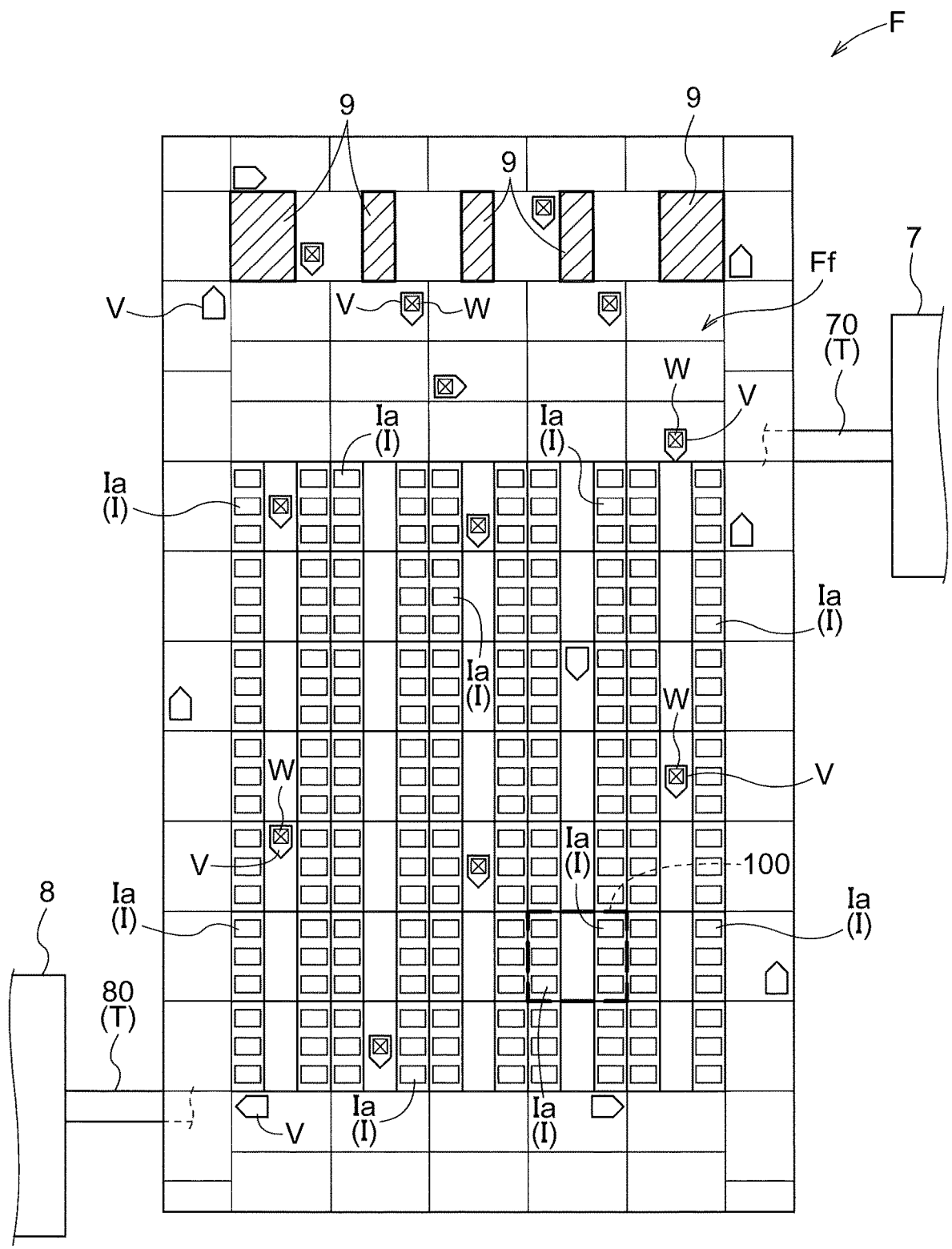
FIG. 1 is a plan view of an article transport facility that includes a frame unit.

As shown in FIG. 1, an article transport facility F includes article transport vehicles V for transporting an article W, a traveling surface Ff on which the article transport vehicles V travel, article supply sections 9 for supplying transport target articles W to the article transport vehicles V, and receiving sections I for receiving articles W transported by the article transport vehicles V. The traveling surface Ff is formed as a spreading flat surface. Passages R (see FIG. 3 and the like) along which article transport vehicles V travel are defined on the traveling surface Ff. Receiving sections I are provided at multiple locations on the traveling surface Ff, and are configured to receive articles W transported by the article transport vehicles V. In the present embodiment, the receiving sections I provided at the respective locations each include a receiving port Ia for guiding an article W below the traveling surface Ff.

Figure 2:
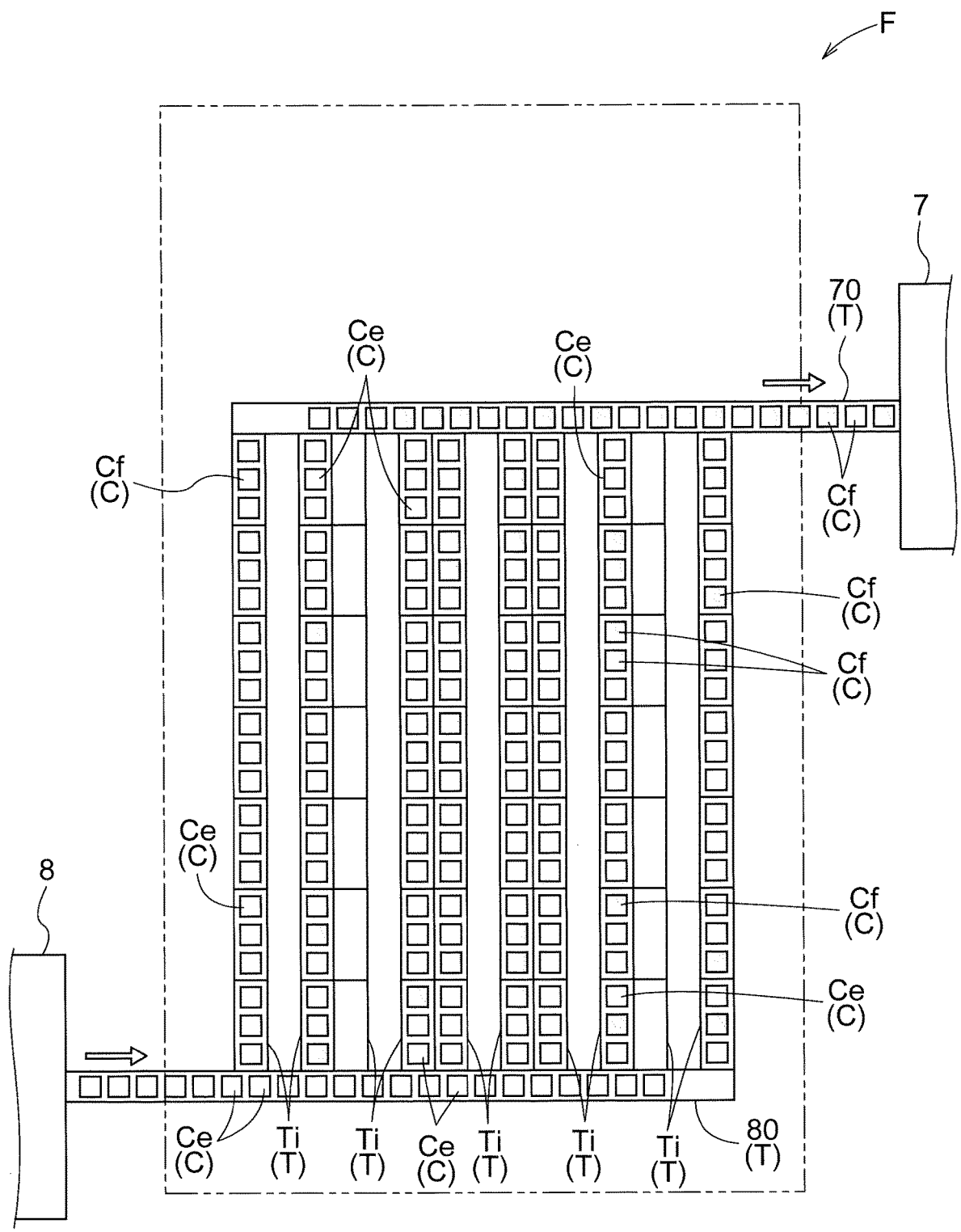
FIG. 2 is an illustrative diagram showing transport routes along which containers are transported by a transport section.

As shown in FIG. 2, the article transport facility F includes transport sections T for transporting containers C, which are for storing at least one article W, an empty container supply section 8 for supplying containers C that are empty and not storing an article W (hereinafter, referred to as an "empty container Ce"), and a shipping section 7 for shipping containers C that are storing at least one article W (hereinafter, referred to as a "filled container Cf"). The transport sections T are arranged below the traveling surface Ff (see FIG. 1). In the present embodiment, the transport sections T include an empty container loading section 80 for receiving empty containers Ce supplied from an empty container supply section 8, a filled container unloading section 70 for discharging filled containers Cf that are storing articles W and were received in receiving sections I, and receiving/transporting sections Ti provided so as to connect the empty container loading section 80 and the filled container unloading section 70. In the present embodiment, the transport sections T include a plurality of receiving/transporting sections Ti, and the receiving/transporting sections Ti are provided so as to connect the empty container loading section 80 and the filled container unloading section 70. In this example, a plurality of receiving/transporting sections Ti are arranged side by side in parallel in a plan view. In the present embodiment, the empty container loading section 80, the filled container unloading section 70, and the receiving/transporting sections Ti are each constituted by a conveyor.

As shown in FIGS. 1 and 2, the receiving sections I are arranged so as to be overlapped with the receiving/transporting sections Ti in a plan view. Containers C are arranged at positions corresponding to the receiving sections I in the receiving/transporting sections Ti. Accordingly, articles W received from the article transport vehicles V in the receiving sections I pass through the receiving ports Ia and are guided to positions below the traveling surface Ff, and are then stored in containers C arranged in the receiving/transporting sections Ti (see FIGS. 3 and 4 as well). In the present embodiment, a plurality of receiving sections I are arranged side by side with each other for each of the receiving/transporting sections Ti. Also, a container C is arranged at a position corresponding to each of the receiving sections I, or more specifically at a position directly under each of the receiving sections I.

In the present embodiment, the empty container loading section 80 is configured to transport a plurality of containers C in container groups in synchronization, each container group including the same number of containers C as the number of receiving sections I provided for each receiving/transporting section Ti. The receiving/transporting sections Ti and the filled container unloading sections 70 are similarly configured to transport a plurality of containers C in container groups in synchronization. In the illustrated example, 21 receiving sections I are provided for each receiving/transporting section Ti, each container group includes 21 containers C, and the empty container loading section 80 and the filled container unloading section 70 transport the 21 containers C in each container group in synchronization. In this case, the receiving/transporting sections Ti each transport a group of 21 containers C after articles W have been stored in all of the 21 containers C included in that container group.

For example, in this article transport facility F, articles W are sorted by being received by specified receiving sections I that have been designated based on sorting information indicating types, quantities, shipping destinations, and the like of the articles W. The sorted articles W are stored in the containers C and transported by the transport sections T.

Figure 3:
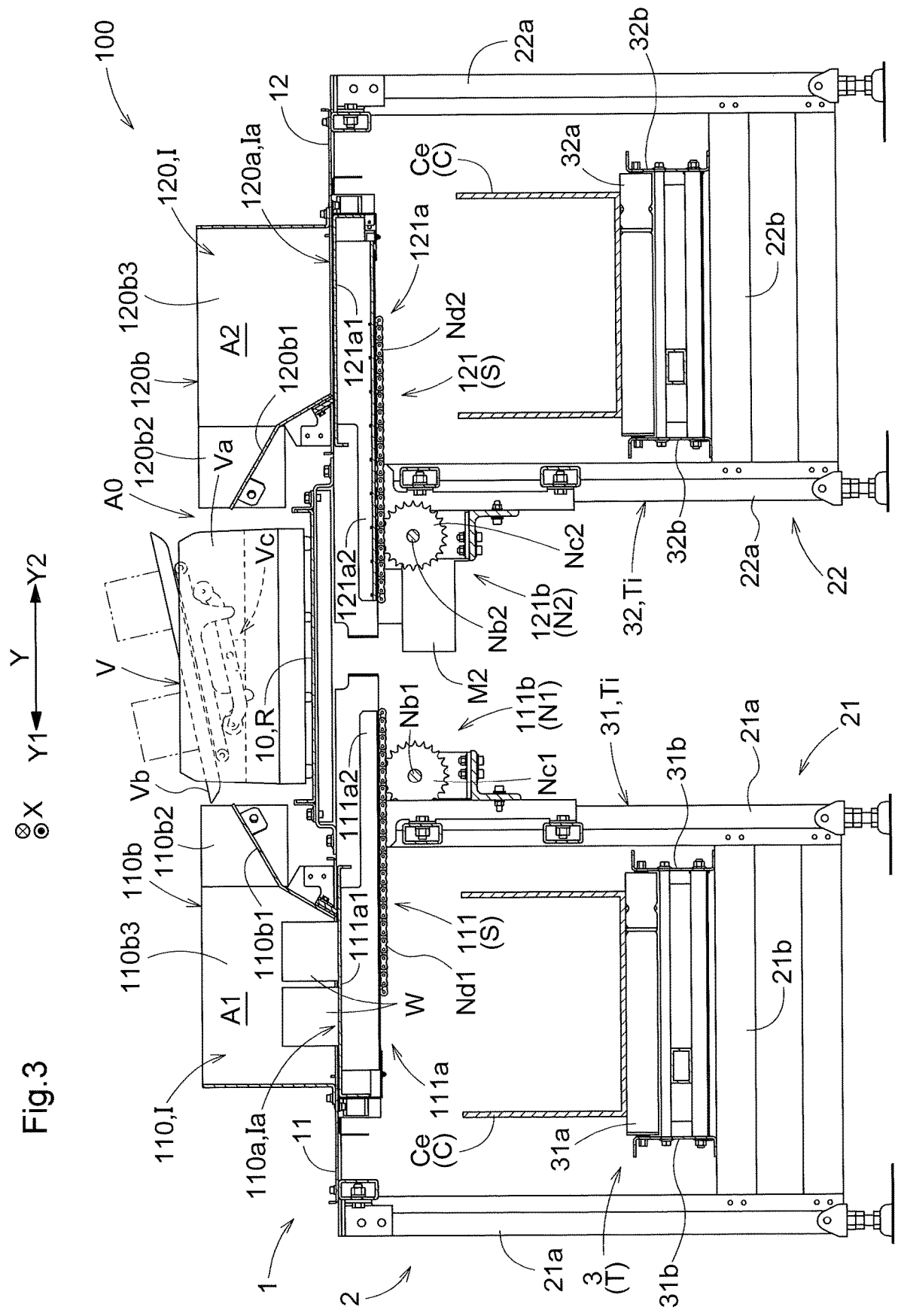
FIG. 3 is a traveling direction view showing how an article is transferred to a receiving section by an article transport vehicle.
Figure 4:
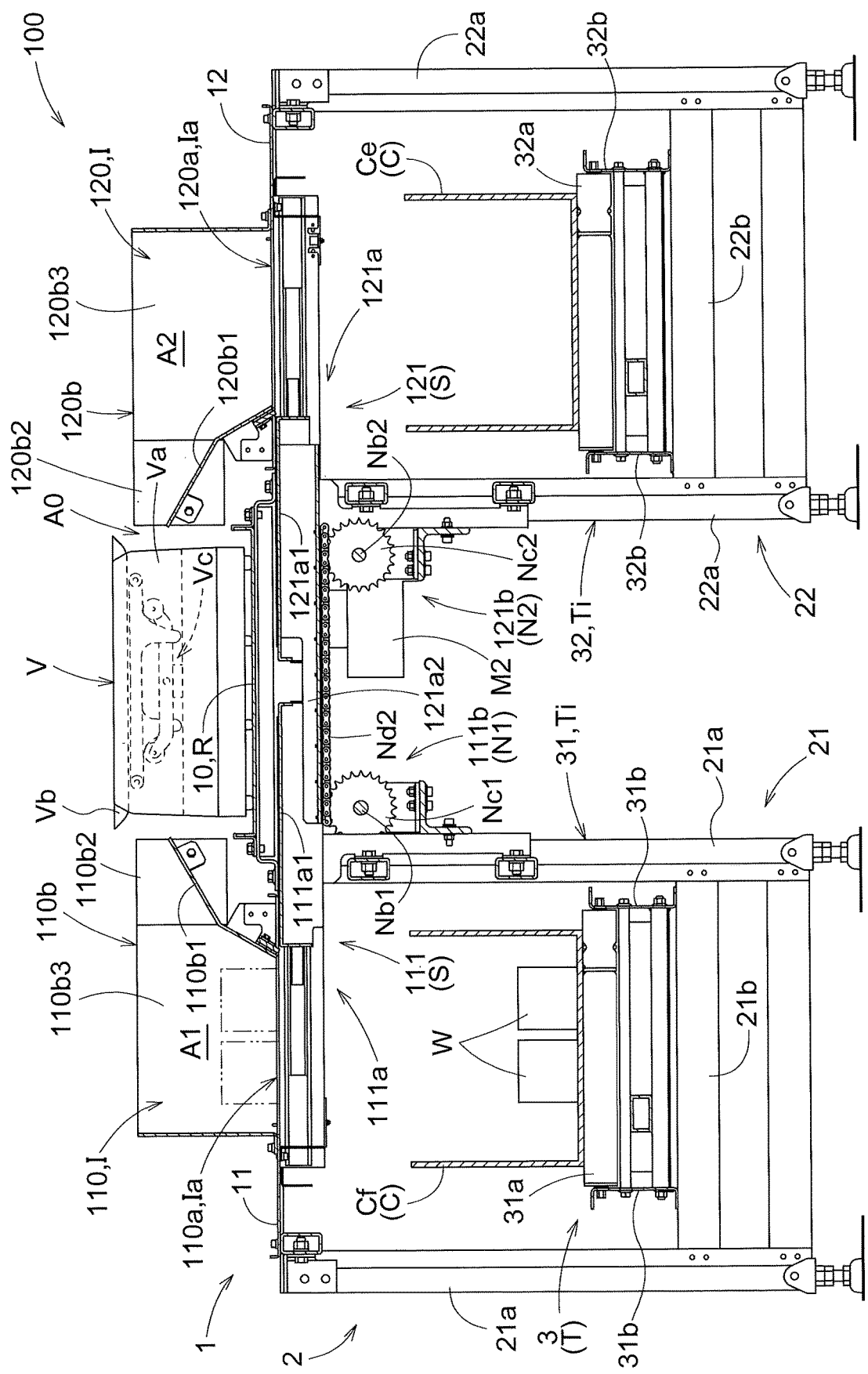
FIG. 4 is a traveling direction view showing how an article is dropped from the receiving section onto a conveyor unit.

In the present embodiment, the article transport facility F includes shutters S for opening and closing the receiving ports Ia (see FIGS. 3 and 4). Each shutter S keeps the corresponding receiving port Ia closed until the receiving section I has received at least one article W that is to be sorted based on the sorting information. The shutter S then opens the receiving port Ia after the receiving section I has received at least one article W that is to be sorted based on the sorting information. Accordingly, the articles W sorted to the receiving sections I by the article transport vehicles V pass through the receiving ports Ia and are guided to a position below the traveling surface Ff, and are stored in containers C arranged in the receiving/transporting sections Ti.

In each of the article supply sections 9, an article W for which a specified receiving section I has been designated as a transport destination based on the sorting information is supplied to an article transport vehicle V by a supply entity such as a worker or a robot, for example. The article transport vehicle V that received the article W in the article supply section 9 then travels along a passage R (see FIG. 3, for example) defined on the traveling surface Ff, and transports the article W to the receiving section I that was designated based on the sorting information.

Each of the receiving sections I is provided with a position information holder (not shown) that holds position information indicating a position corresponding to the receiving section I. An article transport vehicle V travels toward a specified receiving section I that was designated as a transport destination, and when a position information detector (not shown) detects the position information held by the position information holder that corresponds to the specified receiving section I, the article transport vehicle V stops at that position (or transitions to a low-speed traveling state) and transfers an article W to that receiving section I. The position information holder is constituted by, for example, an indicator such as a barcode (e.g., a two-dimensional barcode) that indicates position information, a storage element such as an RFID tag (radio frequency identifier tag) that stores position information, or a signal transmitter such as a beacon that emits a signal indicating position information. For example, if the position information holder is a barcode, the position information detector is configured as a barcode reader, if the position information holder is an RFID tag, the position information detector is configured as an RFID reader, and if the position information holder is a beacon, the position information detector is configured as a signal receiver.

As shown in FIG. 1, the frame unit 100 according to the present embodiment constitutes a portion of the article transport facility F. The portion indicated by the reference numeral "100" in FIG. 1 is the frame unit 100. In this example, a plurality of frame units 100 are arranged side by side in a grid pattern in a plan view to form one traveling surface Ff. Note that in FIG. 1, in order to facilitate understanding one frame unit 100, the reference number "100" denotes one of a plurality of frame units 100 that form one traveling surface Ff.

Figure 5:
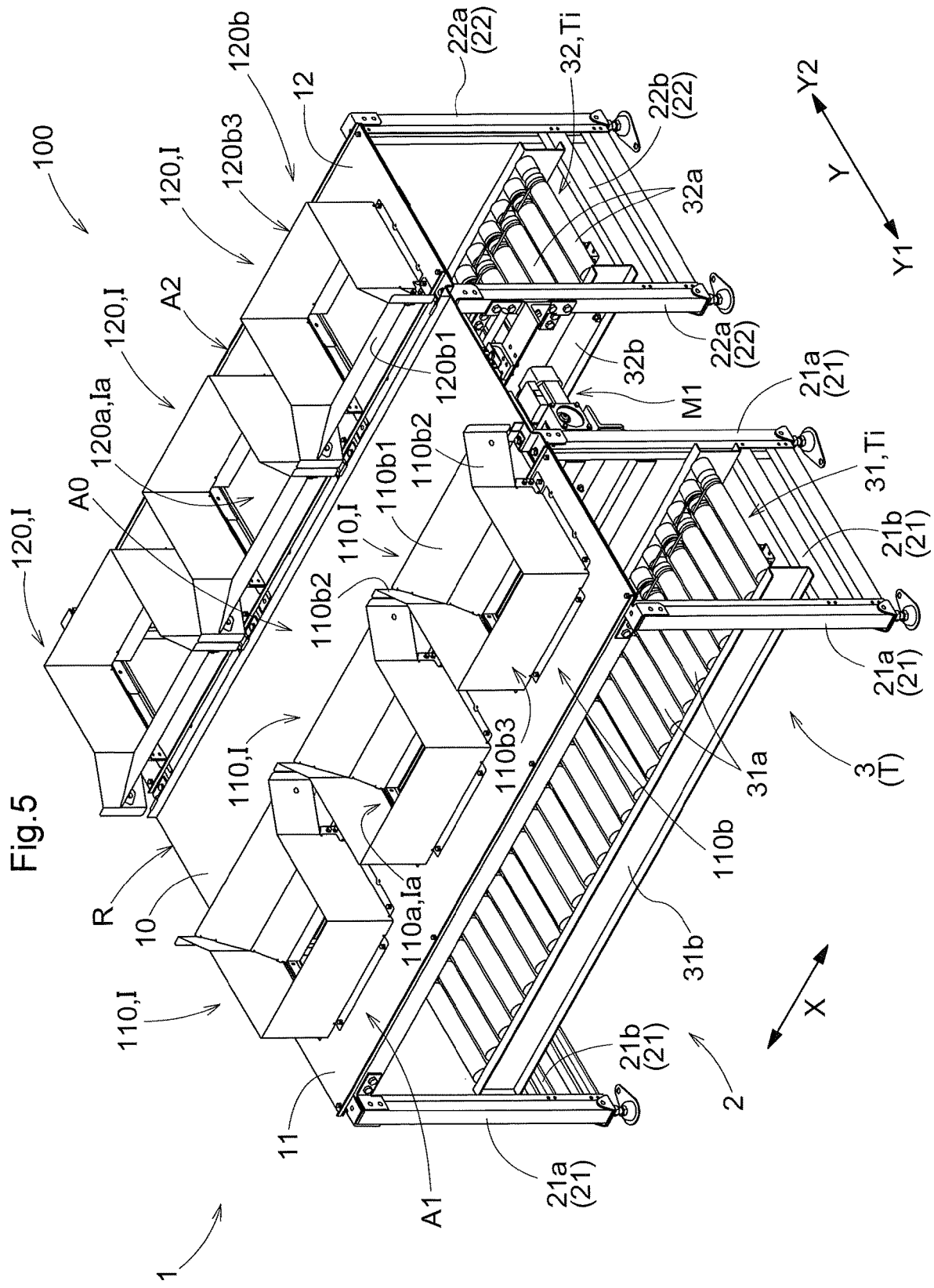
FIG. 5 is a perspective view of a first unit.

FIGS. 3 to 5 show one frame unit 100. More specifically, FIGS. 3 and 4 are traveling direction views of the frame unit 100, and FIG. 5 is a perspective view of the frame unit 100. The following continuing description is given mainly with reference to these drawings.

Article Transport Vehicle

As shown in FIGS. 3 and 4, each article transport vehicle V is configured to travel along a passage R defined by the traveling surface Ff (see FIG. 1) so as to transport an article W from an article supply section 9 to a receiving section I. In the following description, the direction in which the article transport vehicle V travels along the passage R will be referred to as the "traveling direction X", and the direction orthogonal to the traveling direction X in a plan view will be referred to as the "width direction Y". Also, one side in the width direction Y will be referred to as the "first side Y1 in the width direction", and the other side will be referred to as the "second side Y2 in the width direction".

In the present embodiment, the article transport vehicle V includes a carriage body Va that has wheels, a support portion Vb for supporting an article W, and a transfer portion Vc for operating the support portion Vb so as to transfer the article W.

In the present embodiment, the support portion Vb is configured such that an article W can be placed thereon. In this example, the support portion Vb is plate-shaped, and an article W is placed on the upper surface thereof. Also, in this example, the support portion Vb is provided on the upper portion of the carriage body Va, and is configured to swing about an axis extending along the traveling direction X relative to the carriage body Va.

The transfer portion Vc includes a drive source such as a motor. In the present embodiment, the transfer portion Vc is configured to swing the support portion Vb about the axis extending along the traveling direction X relative to the carriage body Va. As shown in FIG. 3, the transfer portion Vc is configured to tilt the support portion Vb in the width direction Y to cause the article W to slide in the width direction Y on the support portion Vb, and thus transfer the article W to a transfer location outward of the article transport vehicle V in the width direction Y. In this example, by swinging the support portion Vb, the transfer portion Vc delivers the article W to the receiving section I (transfer location) that is located on either the first side Y1 in the width direction or the second side Y2 in the width direction relative to the article transport vehicle V. Note that FIG. 3 shows how an article W is transferred to the receiving section I arranged on the first side Y1 in the width direction relative to the article transport vehicle V.

Frame Unit

The frame unit 100 includes a top plate section 1, a support leg section 2 that supports the top plate section 1 from below, and an article support section 3 that supports an article W. The top plate section 1 is coupled to the upper portion of the support leg section 2, and is arranged at a position at a certain distance above the floor surface. The article support section 3 is arranged below the top plate section 1. In the present embodiment, the article support section 3 is a conveyor unit that transports an article W along a predetermined transport direction while the article W is placed thereon. This will be described in detail later.

The top plate section 1 has a passage area A0 provided with the passage R for traveling of the article transport vehicle V, and a first receiving area A1 (corresponding to a "receiving area") provided with a plurality of first receiving sections 110 (corresponding to a "receiving section") that receive articles W from the article transport vehicle V. In the present embodiment, in addition to the first receiving area A1, the top plate section 1 also has a second receiving area A2 provided with a plurality of second receiving sections 120 that receive articles W from the article transport vehicle V. The first receiving area A1 and the second receiving area A2 are arranged on opposite sides of the passage area A0 in the width direction Y. Here, the first receiving area A1 is arranged on the first side Y1 in the width direction relative to the passage area A0, and the second receiving area A2 is arranged on the second side Y2 in the width direction relative to the passage area A0. Note that the first receiving sections 110 and the second receiving sections 120 are sections for receiving an article W transported by the article transport vehicle V, and are included in the above-mentioned receiving sections I.

In the present embodiment, the top plate section 1 includes a passage top plate member 10 that forms the passage area A0, a first top plate member 11 that forms the first receiving area A1, and a second top plate member 12 that forms the second receiving area A2. In other words, in this example, the passage R for the article transport vehicle V is provided on the passage top plate member 10, the first receiving sections 110 are provided on the first top plate member 11, and the second receiving sections 120 are provided on the second top plate member 12.

The first top plate member 11 is arranged on the first side Y1 in the width direction relative to the passage top plate member 10. The second top plate member 12 is arranged on the second side Y2 in the width direction relative to the passage top plate member 10. The passage top plate member 10 is configured to couple the first top plate member 11 and the second top plate member 12 in the width direction Y. The passage top plate member 10 and the first top plate member 11 are detachably coupled by fastening members such as bolts. Similarly, the passage top plate member 10 and the second top plate member 12 are detachably coupled by fastening members such as bolts.

As shown in FIG. 5, in the present embodiment, a plurality of first receiving sections 110 are arranged side by side along the traveling direction X in the first receiving area A1. Also, a plurality of second receiving sections 120 are arranged side by side along the traveling direction X in the second receiving area A2. In this example, the number of first receiving sections 110 provided in the first receiving area A1 and the number of second receiving sections 120 provided in the second receiving area A2 are the same. In the illustrated example, one top plate section 1 is provided with three first receiving sections 110 in the first receiving area A1, and the same number of (three) second receiving sections 120 are provided in the second receiving area A2. Also, in this example, the second receiving sections 120 are arranged at the same positions in the traveling direction X as the first receiving sections 110. Accordingly, the article transport vehicle V can transfer an article W to either a first receiving section 110 or a second receiving section 120 while the article transport vehicle V is stopped at a transfer position in the passage R.

As shown in FIGS. 3 and 4, each of the first receiving sections 110 includes a first opening 110a (corresponding to an "opening") that passes through the top plate section 1 in the up-down direction. In this example, the first opening 110a is formed so as to pass through the first top plate member 11 in the up-down direction. Each of the second receiving sections 120 has a second opening 120a that passes through the top plate section 1 in the up-down direction. In this example, the second opening 120a is formed so as to pass through the second top plate member 12 in the up-down direction. The first opening 110a and the second opening 120a are openings for receiving an article W from the article transport vehicle V, and are included in the above-mentioned receiving ports Ia. Note that in this example, an article W is introduced (transferred) to the first opening 110a or the second opening 120a by the article transport vehicle V.

As described above, in the present embodiment, a plurality of the first receiving sections 110 are arranged side by side along the traveling direction X. Also, a plurality of the second receiving sections 120 are arranged side by side along the traveling direction X. For this reason, a plurality of the first openings 110a are arranged side by side along the traveling direction X. Also, a plurality of the second openings 120a are arranged side by side along the traveling direction X. The second openings 120a are arranged at the same positions in the traveling direction X as the first openings 110a. In other words, a first opening 110a and a second opening 120a that correspond to each other are arranged side by side along the width direction Y.

In the present embodiment, each of the first receiving sections 110 includes a first guide member 110b that guides an article W received from the article transport vehicle V to the first opening 110a. Each of the second receiving sections 120 includes a second guide member 120b that guides an article W received from the article transport vehicle V to the second opening 120a. Accordingly, an article W can be appropriately received from the article transport vehicle V.

In the present embodiment, the first guide member 110b includes an inclined portion 110b1 that is arranged adjacent, on the second side Y2 in the width direction, to the first opening 110a and is inclined downward while extending from the second side Y2 in the width direction toward the first side Y1 in the width direction. An article W received from the article transport vehicle V at a position above the first opening 110a and on the second side Y2 in the width direction is guided by the inclined portion 110b1 downward and toward the first side Y1 in the width direction so as to be guided to the first opening 110a.

As shown in FIGS. 3 to 5, in the present embodiment, the first guide member 110b includes a pair of guide wall portions 110b2 that guide an article W received from the article transport vehicle V to an appropriate position in the traveling direction X. The pair of guide wall portions 110b2 are arranged at positions adjacent, on the second side Y2 in the width direction, to the first opening 110a and separated from each other in the traveling direction X. In this example, the pair of guide wall portions 110b2 are in a tapered arrangement in which the distance between them in the traveling direction X becomes smaller from the second side Y2 in the width direction toward the first side Y1 in the width direction. More specifically, the distance in the traveling direction X between the end portions of the pair of guide wall portions 110b2 on the second side Y2 in the width direction is larger than the size of the first opening 110a in the traveling direction X, and the distance in the traveling direction X between the end portions of the pair of guide wall portions 110b2 on the first side Y1 in the width direction is equal to (or less than) the size of the first opening 110a in the traveling direction X. Accordingly, the article W received from the article transport vehicle V can be appropriately guided to the first opening 110a. In this example, the guide wall portions 110b2 are respectively connected to the two end portions of the inclined portion 110b1 in the traveling direction X, and are formed so as to extend along the up-down direction.

Also, in the present embodiment, the first guide member 110b includes a peripheral wall portion 110b3 that surrounds the first opening 110a. The peripheral wall portion 110b3 is formed so as to rise upward from the periphery of the first opening 110a. Accordingly, an article W received from the article transport vehicle V can be prevented from protruding outward from the first opening 110a, and the article W can be appropriately guided to the first opening 110a. In this way, the first guide member 110b functions as a chute that guides the article W to the first opening 110a.

The second guide member 120b has a configuration similar to that of the first guide member 110b. Specifically, in the present embodiment, the second guide member 120b includes an inclined portion 120b1 that is arranged adjacent, on the first side Y1 in the width direction, to the second opening 120a and is inclined downward while extending from the first side Y1 in the width direction toward the second side Y2 in the width direction. An article W received from the article transport vehicle V at a position above the second opening 120a and on the first side Y1 in the width direction is guided by the inclined portion 120b1 downward and toward the second side Y2 in the width direction so as to be guided to the second opening 120a.

In the present embodiment, the second guide member 120b includes a pair of guide wall portions 120b2 that guide an article W received from the article transport vehicle V to an appropriate position in the traveling direction X. The pair of guide wall portions 120b2 are arranged at positions adjacent, on the first side Y1 in the width direction, to the second opening 120a and separated from each other in the traveling direction X. In this example, the pair of guide wall portions 120b2 are in a tapered arrangement in which the distance between them in the traveling direction X becomes smaller from the first side Y1 in the width direction toward the second side Y2 in the width direction. More specifically, the distance in the traveling direction X between the end portions of the pair of guide wall portions 120b2 on the first side Y1 in the width direction is larger than the size of the second opening 120a in the traveling direction X, and the distance in the traveling direction X between the end portions of the pair of guide wall portions 120b2 on the second side Y2 in the width direction is equal to (or less than) the size of the second opening 120a in the traveling direction X. Accordingly, the article W received from the article transport vehicle V can be appropriately guided to the second opening 120a. In this example, the guide wall portions 120b2 are respectively connected to the two end portions of the inclined portion 120b1 in the traveling direction X, and are formed so as to extend along the up-down direction.

Also, in the present embodiment, the second guide member 120b includes a peripheral wall portion 120b3 that surrounds the second opening 120a. The peripheral wall portion 120b3 is formed so as to rise upward from the periphery of the second opening 120a. Accordingly, an article W received from the article transport vehicle V can be prevented from protruding outward from the second opening 120a, and the article W can be appropriately guided to the second opening 120a. In this way, the second guide member 120b functions as a chute that guides the article W to the second opening 120a.

As described above, the support leg section 2 is configured to support the top plate section 1 from below. The support leg section 2 includes first leg members 21 arranged so as to be overlapped with the first receiving area A1 in a plan view. In the present embodiment, in addition to the first leg members 21, the support leg section 2 also includes second leg members 22 arranged so as to be overlapped with the second receiving area A2 in a plan view.

The first top plate member 11 is supported from below by the first leg members 21. Also, the second top plate member 12 is supported from below by the second leg members 22. In the present embodiment, the passage top plate member 10 is supported by the first leg members 21 via the first top plate member 11, and is supported by the second leg members 22 via the second top plate member 12. In other words, in the present embodiment, dedicated support members for supporting the passage top plate member 10 are not provided.

In the present embodiment, the first leg members 21 include a plurality of strut members 21a that support the first top plate member 11 and a plurality of beam members 21b that couple the strut members 21a to each other. In this example, the strut members 21a are provided at positions corresponding to the four corners of the first top plate member 11 that is rectangular in a plan view. In other words, at least four strut members 21a are provided for the first top plate member 11. The beam members 21b extend along the width direction Y so as to each couple a pair of strut members 21a arranged adjacent to each other in the width direction Y, at positions corresponding to the two end portions of the first top plate member 11 in the traveling direction X. In other words, in this example, the pair of beam members 21b extend along the width direction Y at positions apart from each other in the traveling direction X. The pair of beam members 21b are arranged at the same height as each other. However, the number of strut members 21a and beam members 21b included in the first leg members 21 is not limited to the above configuration, and can be set as desired.

The second leg members 22 have a configuration similar to that of the first leg members 21. Specifically, in the present embodiment, the second leg members 22 include a plurality of strut members 22a that support the second top plate member 12, and a plurality of beam members 22b that couple the strut members 22a to each other. In this example, the strut members 22a are provided at positions corresponding to the four corners of the second top plate member 12 that is rectangular in a plan view. In other words, at least four strut members 22a are provided for the second top plate member 12. The beam members 22b extend along the width direction Y so as to each couple a pair of strut members 22a arranged adjacent to each other in the width direction Y, at positions corresponding to the two end portions of the second top plate member 12 in the traveling direction X. In other words, in this example, the pair of beam members 22b extend along the width direction Y at positions apart from each other in the traveling direction X. The pair of beam members 22b are arranged at the same height as each other. However, the number of strut members 22a and beam members 22b included in the second leg members 22 is not limited to the above configuration, and can be set as desired.

The article support section 3 is configured to support, at a position below the top plate section 1, an article W that has been received by the first receiving section 110 and has passed through the first opening 110a. In the present embodiment, the article support section 3 is configured to support containers C, and can support empty containers Ce in which no article W is stored and filled containers Cf in which an article W is stored. In other words, in this example, the article support section 3 is configured to indirectly support an article W via a container C.

As described above, the article support section 3 is arranged below the top plate section 1. Accordingly, the article support section 3, which is a conveyor unit, is configured to transport an article W below the top plate section 1. In the present embodiment, the article support section 3 is configured to transport an article W stored in a container C by transporting the container C. In this example, the article support section 3 is configured as a portion of the transport section T (see FIG. 2 as well), and is provided in a transport route between the empty container loading section 80 and the filled container unloading section 70.

The article support section 3 is arranged so as to extend directly under the first openings 110a, and is supported by the first leg members 21. In the present embodiment, the article support section 3 includes a portion that is supported by the first leg members 21 and arranged so as to extend directly under the first openings 110a, and a portion that is supported by the second leg members 22 and arranged so as to extend directly under the second openings 120a.

In the present embodiment, the article support section 3 includes a first conveyor 31 and a second conveyor 32. The first conveyor 31 is arranged so as to extend directly under the first opening 110a of each of the first receiving sections 110, and is supported by the first leg members 21. For this reason, in this example, the first conveyor 31 extends along the arrangement direction in which the plurality of first receiving sections 110 are arranged (the traveling direction X in this example), and is supported by the first leg members 21 and not by the second leg members 22. The second conveyor 32 is arranged so as to extend directly under the second opening 120a of each of the second receiving sections 120, and is supported by the second leg members 22. For this reason, in this example, the second conveyor 32 extends along the arrangement direction in which the plurality of second receiving sections 120 are arranged (the traveling direction X in this example), and is supported by the second leg members 22 and not by the first leg members 21.

In the present embodiment, the first conveyor 31 constitutes a portion of the receiving/transporting section Ti, and can support a plurality of containers C arranged side by side along the traveling direction X (see FIG. 2 as well). Specifically, the first conveyor 31 is able to support containers C received from the empty container loading section 80 (i.e., empty containers Ce), at positions corresponding to the first openings 110a of the first receiving sections 110. In this example, the first conveyor 31 is able to support containers C (empty containers Ce) at positions respectively overlapped with the first openings 110a (first receiving sections 110) in a plan view. When an article W received by a first receiving section 110 is stored in a container C, the first conveyor 31 transports that container C (filled container Cf). In this example, after articles W sorted based on the sorting information have been stored in all of the containers C arranged side by side along the traveling direction X, the first conveyor 31 transports all of the containers C in a group.

As shown in FIGS. 3 and 4, in the present embodiment, the first conveyor 31 includes a conveying member 31a and a conveying support member 31b that supports the conveying member 31a. In this example, the first conveyor 31 is constituted by a roller conveyor, and the conveying member 31a is constituted by rollers. The conveying support member 31b is constituted by a frame to which the conveying member 31a is coupled. In this example, the conveying support member 31b rotatably supports the rollers that constitute the conveying member 31a.

In the present embodiment, the first conveyor 31 is supported by the beam members 21b of the first leg members 21. Specifically, the first conveyor 31 is supported in a state of being mounted on the beam members 21b of the first leg members 21. In this example, the conveying support member 31b of the first conveyor 31 is fixed to the beam members 21b of the first leg members 21 while being in contact with the beam members 21b from above. According to such a configuration, the first conveyor 31 can be easily attached to the frame unit 100.

The second conveyor 32 has a configuration similar to that of the first conveyor 31. In other words, in the present embodiment, the second conveyor 32 constitutes a portion of the receiving/transporting section Ti, and can support a plurality of containers C arranged side by side along the traveling direction X (see FIG. 2 as well). Specifically, the second conveyor 32 is able to support containers C received from the empty container loading section 80 (i.e., empty containers Ce), at positions corresponding to the second openings 120a of the second receiving sections 120. In this example, the second conveyor 32 is able to support containers C (empty containers Ce) at positions respectively overlapped with the second openings 120a (second receiving sections 120) in a plan view. When an article W received by a second receiving section 120 is stored in a container C, the second conveyor 32 transports that container C (filled container Cf). In this example, after articles W sorted based on the sorting information have been stored in all of the containers C arranged side by side along the traveling direction X, the second conveyor 32 transports all of the containers C in a group.

As shown in FIGS. 3 and 4, in the present embodiment, the second conveyor 32 includes a conveying member 32a and a conveying support member 32b that supports the conveying member 32a. In this example, the second conveyor 32 is constituted by a roller conveyor, and the conveying member 32a is constituted by rollers. The conveying support member 32b is constituted by a frame to which the conveying member 32a is coupled. In this example, the conveying support member 32b rotatably supports the rollers that constitute the conveying member 32a.

In the present embodiment, the second conveyor 32 is supported by the beam members 22b of the second leg members 22. Specifically, the second conveyor 32 is supported in a state of being mounted on the beam members 22b of the second leg members 22. In this example, the conveying support member 32b of the second conveyor 32 is fixed to the beam members 22b of the second leg members 22 while being in contact with the beam members 22b from above. According to such a configuration, the second conveyor 32 can be easily attached to the frame unit 100.

In the present embodiment, the frame unit 100 includes first shutters 111 that open and close the first openings 110a, and second shutters 121 that open and close the second openings 120a. Note that the first shutters 111 and the second shutters 121 correspond to the shutters S described above. In other words, the shutters S include the first shutters 111 and the second shutters 121. Note that in this example, the first shutters 111 are coupled to the first leg members 21. Also, the second shutters 121 are coupled to the second leg members 22.

Figure 6:
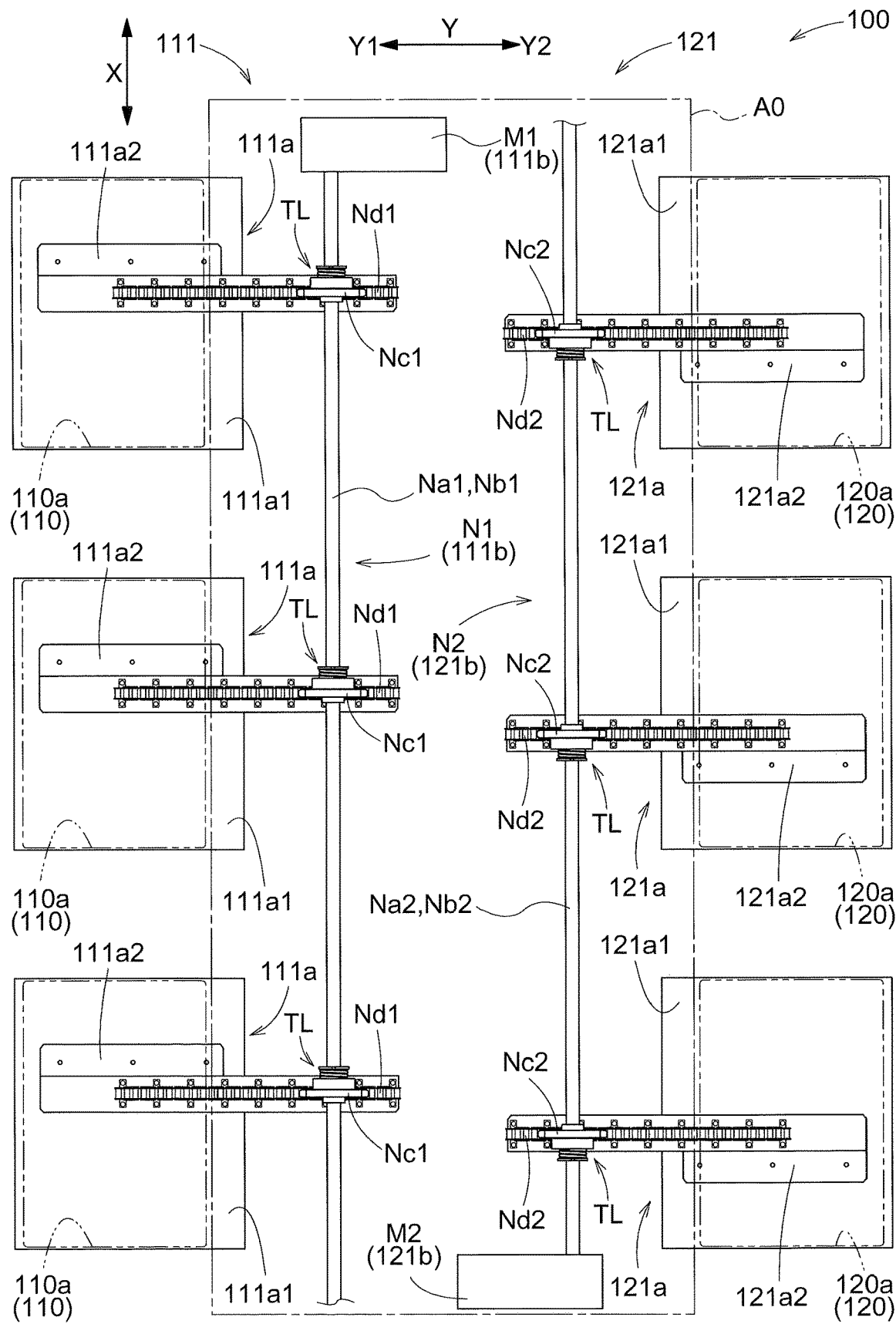
FIG. 6 is a diagram showing a door member in a closed orientation from below.
Figure 7:
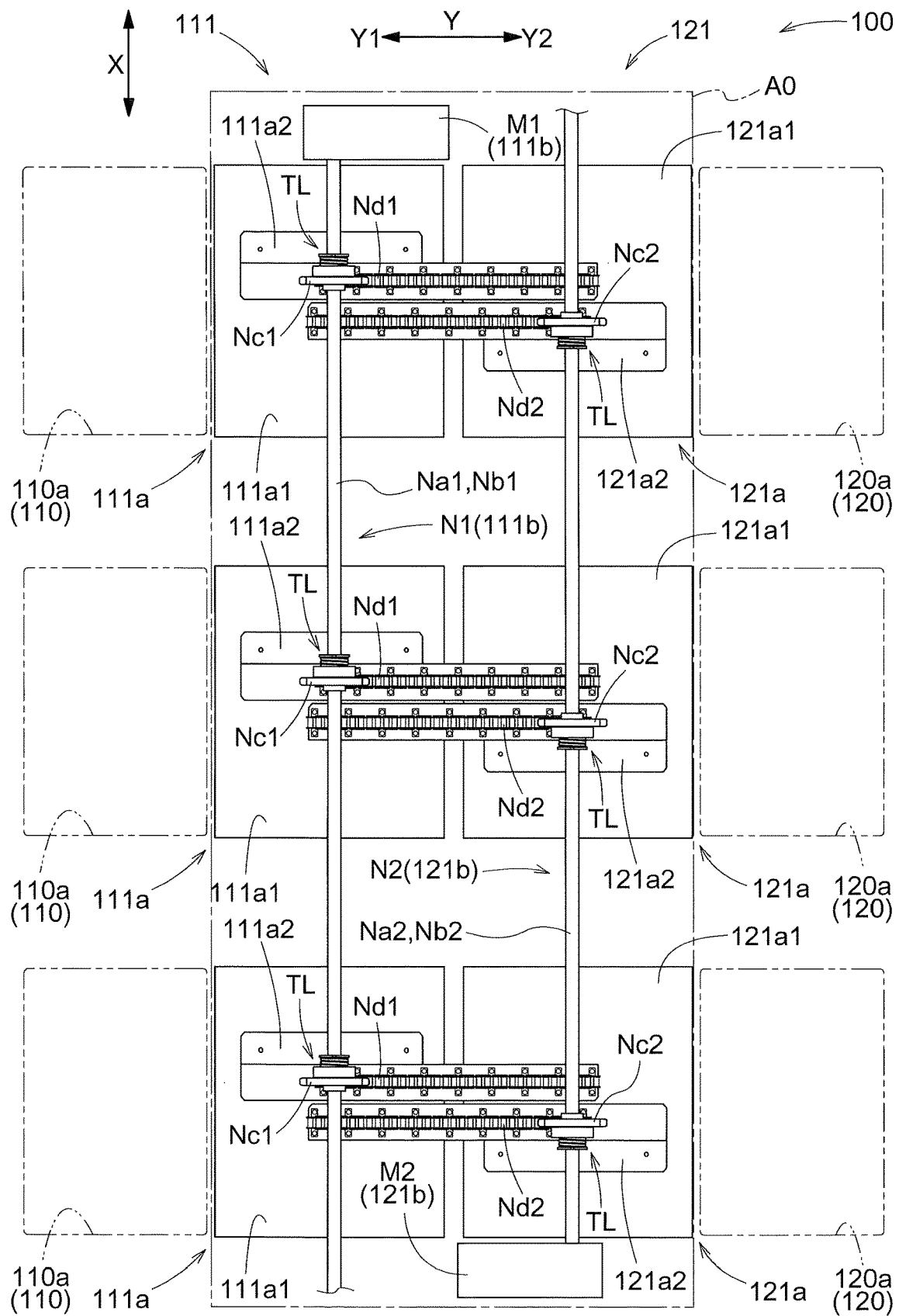
FIG. 7 is a diagram showing the door member in an open orientation from below.

As shown in FIGS. 6 and 7, the frame unit 100 includes first door members 111a (corresponding to a "door member") that are provided in correspondence with the first openings 110a and can change between an open orientation in which the corresponding first opening 110a is open and a closed orientation in which the corresponding first opening 110a is closed, and a first door drive section 111b (corresponding to a "door drive section") that drives the first door members 111a in order to change the orientation of the first door members 111a. The first door drive section 111b includes a first drive source M1 (corresponding to a "drive source") and a first transmission mechanism N1 (corresponding to a "transmission mechanism") that transmits driving power from the first drive source M1 to the first door members 111a. In the present embodiment, the first door members 111a and the first door drive section 111b are constituent elements of the first shutter 111. Also, in this example, the first drive source M1 is constituted by a motor.

The frame unit 100 includes second door members 121a that are provided in correspondence with the second openings 120a and can change between an open orientation in which the corresponding second opening 120a is open and a closed orientation in which the corresponding second opening 120a is closed, and a second door drive section 121b that drives the second door members 121a in order to change the orientation of the second door members 121a. The second door drive section 121b includes a second drive source M2 and a second transmission mechanism N2 that transmits driving power from the second drive source M2 to the second door members 121a. In the present embodiment, the second door members 121a and the second door drive section 121b are constituent elements of the second shutter 121. Also, in this example, the second drive source M2 is constituted by a motor.

Note that FIGS. 3 and 6 show a state in which the first door members 111a and the second door members 121a are in the closed orientation, that is to say a state in which the first openings 110a and the second openings 120a are closed. On the other hand, FIGS. 4 and 7 show a state in which the first door members 111a and the second door members 121a are in the open orientation, that is, the first openings 110a and the second openings 120a are open.

The first transmission mechanism N1 includes a first output shaft Na1 (corresponding to an "output shaft") from which driving power generated by the first drive source M1 is output, a first transmission shaft Nb1 (corresponding to a "transmission shaft") that is interlocked with the first output shaft Na1 and transmits driving power from the first output shaft Na1 along the traveling direction X, first driving members Nc1 (corresponding to a "driving member") that are attached to the first transmission shaft Nb1 at positions in the traveling direction X that correspond to the first receiving sections 110 aligned in the traveling direction X, and first driven members Nd1 (corresponding to a "driven member") that are fixed to the first door members 111a and follow the first driving members Nc1.

In the present embodiment, the first transmission shaft Nb1 is coupled to the first drive source M1 and has a function of outputting driving power from the first drive source M1 to other portions of the first transmission mechanism N1. In other words, in the present embodiment, the first transmission shaft Nb1 also serves as the first output shaft Na1. This makes it possible to simplify the structure of the first transmission mechanism N1.

The first transmission shaft Nb1 is arranged so as to extend along the traveling direction X. The first driving members Nc1 are coupled to the first transmission shaft Nb1 at a plurality of points in the traveling direction X. In the present embodiment, the first driving members Nc1 are each constituted by a sprocket, and the first driven members Nd1 are each constituted by a chain engaged with the sprocket. However, in this example, the chains are not connected in an endless manner, but rather are used in a state of being arranged in a straight line along the first door members 111a. Note that the configuration is not limited to this, and for example, the first driving member Nc1 may be configured by a pinion, and the first driven member Nd1 may be configured by a rack. Alternatively, the first driving member Nc1 may be constituted by a pulley, and the first driven member Nd1 may be constituted by a belt.

In the present embodiment, the first driven members Nd1 are arranged so as to extend along the width direction Y. Here, in this example, each of the first door members 111a includes a first main body portion 111a1 and a first fixing portion 111a2 that is coupled to the first main body portion 111a1 and fixes the corresponding first driven member Nd1. The first fixing portion 111a2 includes a portion that projects from the first main body portion 111a1 toward the second side Y2 in the width direction. The first driven member Nd1 is fixed to the first fixing portion 111a2 so as to extend along the portion of the first fixing portion 111a2 that projects from the first main body portion 111a1 toward the second side Y2 in the width direction.

In the present embodiment, the first door member 111a is configured to change in orientation by sliding along the width direction Y. Specifically, the first driving member Nc1 (a sprocket in this example) rotates due to the first transmission shaft Nb1 rotating with use of driving power from the first drive source M1. The first driven member Nd1 (a chain in this example) engaged with the first driving member Nc1 moves in the width direction Y as the first driving member Nc1 rotates. Since the first driven member Nd1 is fixed to the first door member 111a, when the first driven member Nd1 moves in the width direction Y, the first door member 111a also moves in the width direction Y. Accordingly, the first door member 111a slides along the width direction Y. The first door member 111a is configured to change in orientation between an open orientation in which the first opening 110a is open and a closed orientation in which the first opening 110a is closed, by sliding along the width direction Y. According to the above configuration, it is possible to suppress an increase in the operating range of the first door member 111a in the up-down direction, and it is possible to reduce the overall size of the frame unit 100 in the up-down direction.

As shown in FIGS. 4 and 7, in the present embodiment, in the open orientation, the first door member 111a is located at a position that is below the top plate section 1 and overlapped with the passage area A0 in a plan view. Accordingly, the first door member 111a in the open orientation can be stored by utilizing space that is below the top plate section 1 and overlapped with the passage area A0 in a plan view. Therefore, the size of the frame unit 100 can be reduced. When the first door member 111a is in the open orientation, at least the portion of the first fixing portion 111a2 that projects from the first main body portion 111a1 in the width direction is overlapped with the passage area A0 in a plan view. In the present embodiment, when the first door member 111a is in the open orientation, the entirety of the first door member 111a is overlapped with the passage area A0 in a plan view.

The second transmission mechanism N2 includes a second output shaft Na2 from which driving power generated by the second drive source M2 is output, a second transmission shaft Nb2 that is interlocked with the second output shaft Na2 and transmits driving power from the second output shaft Na2 along the traveling direction X, second driving members Nc2 that are attached to the second transmission shaft Nb2 at positions in the traveling direction X that correspond to the second receiving sections 120 aligned in the traveling direction X, and second driven members Nd2 that are fixed to the second door members 121a and follow the driving of the second driving members Nc2.

In the present embodiment, the second transmission shaft Nb2 is coupled to the second drive source M2 and has a function of outputting driving power from the second drive source M2 to other portions of the second transmission mechanism N2. In other words, in the present embodiment, the second transmission shaft Nb2 also serves as the second output shaft Na2. This makes it possible to simplify the structure of the second transmission mechanism N2.

The second transmission shaft Nb2 is arranged so as to extend along the traveling direction X. The second driving members Nc2 are coupled to the second transmission shaft Nb2 at a plurality of points in the traveling direction X. In the present embodiment, the second driving members Nc2 are each constituted by a sprocket, and the second driven members Nd2 are each constituted by a chain engaged with the sprocket. Note that in this example, similarly to the first driven member Nd1, the chains are not connected in an endless manner, but rather are used in a state of being arranged in a straight line along the second door members 121a. Note that the configuration is not limited to this, and for example, the second driving member Nc2 may be configured by a pinion, and the second driven member Nd2 may be configured by a rack. Alternatively, the second driving member Nc2 may be constituted by a pulley, and the second driven member Nd2 may be constituted by a belt.

In the present embodiment, the second driven members Nd2 are arranged so as to extend along the width direction Y. Here, in this example, each of the second door members 121a includes a second main body portion 121a1 and a second fixing portion 121a2 that is coupled to the second main body portion 121a1 and fixes the corresponding second driven member Nd2. The second fixing portion 121a2 includes a portion that projects from the second main body portion 121a1 toward the first side Y1 in the width direction. The second driven member Nd2 is fixed to the second fixing portion 121a2 so as to extend along the portion of the second fixing portion 121a2 that projects from the second main body portion 121a1 toward the first side Y1 in the width direction.

In the present embodiment, the second door member 121a is configured to change in orientation by sliding along the width direction Y. Specifically, the second driving member Nc2 (a sprocket in this example) rotates due to the second transmission shaft Nb2 rotating with use of driving power from the second drive source M2. The second driven member Nd2 (a chain in this example) engaged with the second driving member Nc2 moves in the width direction Y as the second driving member Nc2 rotates. Since the second driven member Nd2 is fixed to the second door member 121*a*, when the second driven member Nd2 moves in the width direction Y, the second door member 121*a* also moves in the width direction Y. Accordingly, the second door member 121*a* slides along the width direction Y. The second door member 121*a* is configured to change in orientation between an open orientation in which the second opening 120*a* is open and a closed orientation in which the second opening 120*a* is closed, by sliding along the width direction Y. According to the above configuration, it is possible to suppress an increase in the operating range of the second door member 121*a* in the up-down direction, and it is possible to reduce the overall size of the frame unit 100 in the up-down direction.

As shown in FIGS. 4 and 7, in the present embodiment, in the open orientation, the second door member 121*a* is located at a position that is below the top plate section 1 and overlapped with the passage area A0 in a plan view. Accordingly, the second door member 121*a* in the open orientation can be stored by utilizing space that is below the top plate section 1 and overlapped with the passage area A0 in a plan view.

Therefore, the size of the frame unit 100 can be reduced. When the second door member 121*a* is in the open orientation, at least the portion of the second fixing portion 121*a*2 that projects from the second main body portion 121*a*1 in the width direction is overlapped with the passage area A0 in a plan view. In the present embodiment, when the second door member 121*a* is in the open orientation, the entirety of the second door member 121*a* is overlapped with the passage area A0 in a plan view.

As shown in FIGS. 4 and 7, in the present embodiment, when both the first door member 111*a* and the second door member 121*a* are in the open orientation, the first driven member Nd1 and the second driven member Nd2 are located at different positions in the traveling direction X and overlap each other in the traveling direction X in a view along the traveling direction X. According to this configuration, the first door member 111*a* and the second door member 121*a* can be arranged at the same position in the traveling direction X so as to reduce the size of the frame unit 100 in the traveling direction X, while also making it possible to prevent the first driven member Nd1 fixed to the first door member 111*a* and the second driven member Nd2 fixed to the second door member 121*a* from interfering with each other when both of the door members are in the open orientation.

More specifically, when a first door member 111*a* and a second door member 121*a* that correspond to each other and are arranged at the same position in the traveling direction X are both in the open orientation, the first driven member Nd1 of the first door member 111*a* and the second driven member Nd2 of the second door member 121*a* are located at different positions in the traveling direction X. Also, at least a portion of the first driven member Nd1 and at least a portion of the second driven member Nd2 are located in the same range in the width direction Y, and overlap each other in the traveling direction X in a view along the traveling direction X. In this example, when both the first door member 111*a* and the second door member 121*a* are in the open orientation, a portion of the first fixing portion 111*a*2, to which the first driven member Nd1 is fixed, and a portion of the second fixing portion 121*a*2, to which the second driven member Nd2 is fixed, are overlapped with each other in a view along the traveling direction X. Accordingly, it is possible to further reduce the size of the frame unit 100.

In the present embodiment, when a first door member 111*a* and a second door member 121*a* that correspond to each other are both in the open orientation, the end portion of the first driven member Nd1 on the second side Y2 in the width direction is located on the second side Y2 in the width direction relative to the end portion of the second driven member Nd2 on the first side Y1 in the width direction. In other words, the end portion of the second driven member Nd2 on the first side Y1 in the width direction is arranged on the first side Y1 in the width direction relative to the end portion of the first driven member Nd1 on the second side Y2 in the width direction. Accordingly, at least a portion of the first driven member Nd1 and at least a portion of the second driven member Nd2 are arranged in the same range in the width direction Y and overlap each other in the traveling direction X in a view along the traveling direction X.

Note that as shown in FIG. 6, when a first door member 111*a* and a second door member 121*a* that correspond to each other are both in the closed orientation, the end portion of the first driven member Nd1 on the second side Y2 in the width direction is located on the first side Y1 in the width direction relative to the end portion of the second driven member Nd2 on the first side Y1 in the width direction. In other words, the end portion of the second driven member Nd2 on the first side Y1 in the width direction is located on the second side Y2 in the width direction relative to the end portion of the first driven member Nd1 on the second side Y2 in the width direction. In other words, when a first door member 111*a* and a second door member 121*a* that correspond to each other are both in the closed orientation, the entirety of the first driven member Nd1 and the entirety of the second driven member Nd2 are located in different ranges in the width direction Y.

In the present embodiment, the first fixing portion 111*a*2 is arranged at a position shifted to one side in the traveling direction X from the center of the first main body portion 111*a*1 in the traveling direction X. Also, the second fixing portion 121*a*2 is arranged at a position shifted to the other side in the traveling direction X from the center of the second main body portion 121*a*1 in the traveling direction X. Accordingly, when a first door member 111*a* and a second door member 121*a* that are arranged at the same position in the traveling direction X are both in the open orientation, the first driven member Nd1 fixed to the first fixing portion 111*a*2 and the second driven member Nd2 fixed to the second fixing portion 121*a*2 do not interfere with each other.

In the present embodiment, the first door member 111*a* and the second door member 121*a* are constituted by members that have the same configuration. Specifically, in this example, the member constituting the second door member 121*a* is the same as the member constituting the first door member 111*a* except for being rotated 180° in the horizontal plane. In opposite terms, the member constituting the first door member 111*a* is the same as the member constituting the second door member 121*a* except for being rotated 180° in the horizontal plane. In this way, since the first door member 111*a* and the second door member 121*a* are constituted by members having the same configuration, the frame unit 100 can be realized at a relatively low cost.

In the present embodiment, the frame unit 100 includes torque limiters TL that limit the torque transmitted through the first transmission mechanism N1 so as not to exceed a set value. In this example, the torque limiters TL are provided in power transmission paths between the first transmission shaft Nb1 and the first driving members Nc1 (see FIG. 8 as well). For example, if the torque transmitted through the first transmission mechanism N1 reaches the set value, the torque limiters TL allow slippage to occur between the first transmission shaft Nb1 and the first driving members Nc1 such that the torque transmitted from the first transmission shaft Nb1 to the first driving members Nc1 is reduced (or set to zero). In other words, in this example, the torque limiters TL are clutches that slide when the transmission torque reaches a set value. Note that the aforementioned set value is appropriately determined depending on the characteristics of the equipment, experimentation, and the like.

In the present embodiment, one torque limiter TL is provided for each of the first driving members Nc1. Although not shown in FIG. 8, in the present embodiment, torque limiters TL are also provided in power transmission paths between the second transmission shaft Nb2 and the second driving members Nc2. One torque limiter TL is provided for each of the second driving members Nc2. Accordingly, even if excessive torque is generated in the first transmission mechanism N1 or the second transmission mechanism N2 when any of the first door members 111*a* or the second door members 121*a* open or close, it is possible to cut off the transmission of motive power in only the portion where there is a high possibility of a problem.

Figure 8:
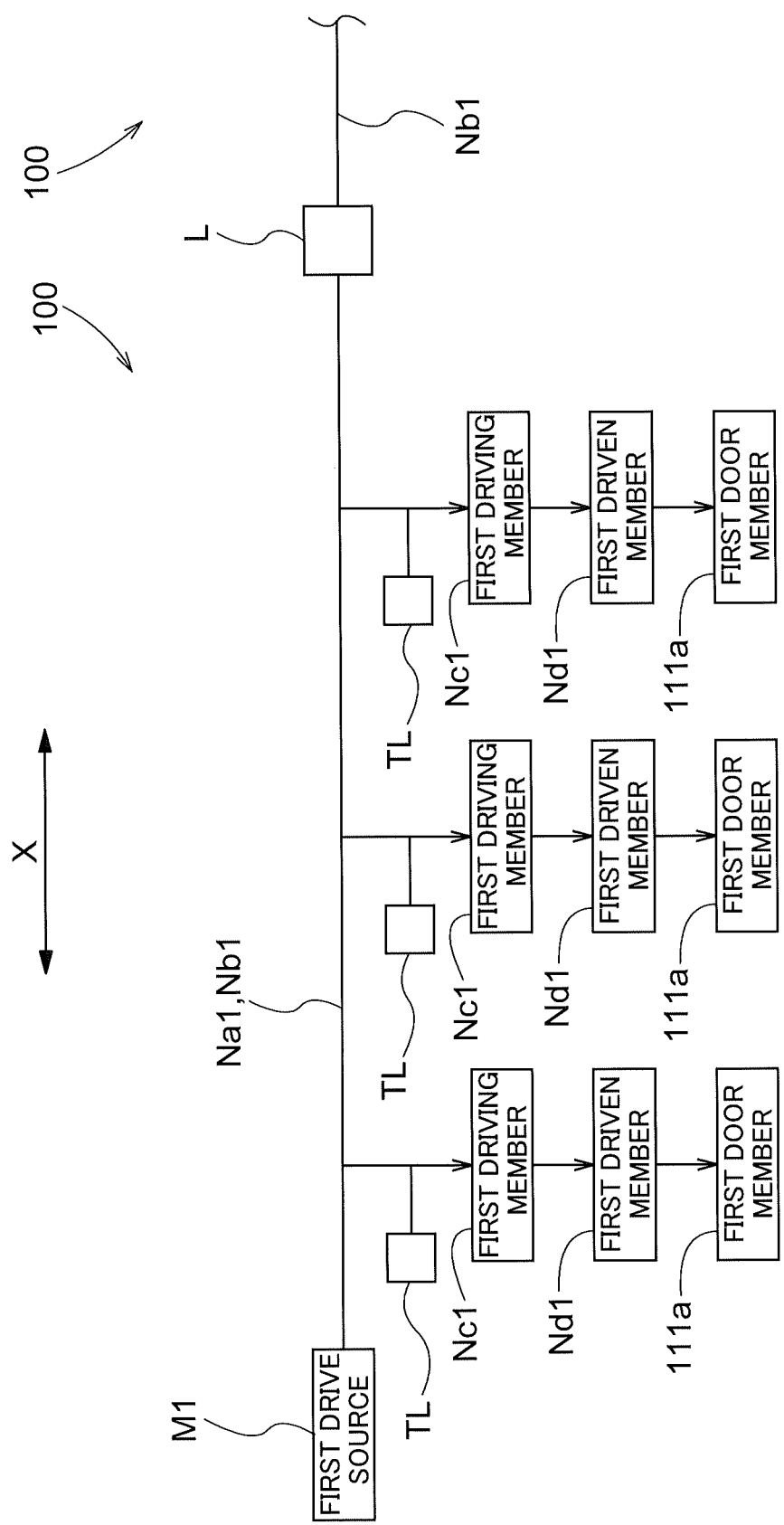
FIG. 8 is a diagram showing a transmission path of driving power generated by a first drive source.

FIG. 8 is an illustrative diagram schematically showing the transmission path of driving power from the first drive source M1. Note that this matter similarly applies to the transmission path of driving power from the second drive source M2. For this reason, the transmission path of driving power from the second drive source M2 is not shown.

As shown in FIG. 8, in the present embodiment, one end portion of the first transmission shaft Nb1 in the axial direction is provided with a coupling portion L that is to be coupled to the first transmission shaft Nb1 provided in another frame unit 100 that is at an adjacent position in the traveling direction X. Accordingly, driving power from the first drive source M1 can be transmitted to the first transmission shaft Nb1 of the frame unit 100. This therefore makes it possible to eliminate the need to provide a first drive source M1 for the other frame unit 100. In this case, the first transmission shaft Nb1 of the other frame unit 100 does not serve as the first output shaft Na1. Note that although not shown, in the present embodiment, one end portion of the second transmission shaft Nb2 in the axial direction is provided with a coupling portion L that is for coupling to the second transmission shaft Nb2 provided in another frame unit 100 that is adjacent to the traveling direction X. Accordingly, driving power from the second drive source M2 can be transmitted to the second transmission shaft Nb2 of the frame unit 100. This therefore makes it possible to eliminate the need to provide a second drive source M2 for the other frame unit 100. In this case, the second transmission shaft Nb2 of the other frame unit 100 does not serve as the second output shaft Na2. Various known shaft joints such as universal joints can be used for the coupling portions L.

According to the configuration described above, it is possible to reduce the size of the frame unit 100.

Other Embodiments

Next, other embodiments of the frame unit will be described.

(1) In the above embodiment, an example is described in which, in the open orientation, the first door member 111*a* is located at a position that is below the top plate section 1 and overlapped with the passage area A0 in a plan view. However, the present invention is not limited to this example, and the first door member 111*a* may be arranged so as to not be overlapped with the passage area A0 in a plan view in an open orientation, for example. This similarly applies to the second door member 121*a*.

(2) In the above embodiment, an example is described in which the first door member 111*a* is configured to change in orientation by sliding along the width direction Y. However, there is no limitation on the direction in which the first door member 111*a* slides. Also, the first door member 111*a* may be configured to change in orientation by swinging or rotating, for example. In this case, there are no particular limitations on the swing direction or the rotation direction. This similarly applies to the second door member 121*a*.

(3) In the above embodiment, an example is described in which the first transmission mechanism N1 includes the first output shaft Na1, the first transmission shaft Nb1, the first driving members Nc1, and the first driven members Nd1. However, the first transmission mechanism N1 need only be able to form a power transmission path from the first drive source M1 to the first door members 111*a*, and may not include any one or more of the above-described members, or alternatively may include members different from the above-described members. This similarly applies to the second transmission mechanism N2.

(4) In the above embodiment, an example is described in which the torque limiters TL allow slippage to occur between the first transmission shaft Nb1 and the first driving members Nc1 in order to prevent a portion of torque from being transmitted from the first transmission shaft Nb1 to the first driving members Nc1. However, the present invention is not limited to this example, and the torque limiters TL may be configured as a control circuit of a control unit or a control program that limits the torque generated by the first drive source M1 so as not to exceed a set value, for example.

(5) In the above embodiment, an example is described in which the frame unit 100 includes the torque limiters TL that limit the torque transmitted through the first transmission mechanism N1 so as not to exceed a set value. However, the present invention is not limited to this example, and the frame unit 100 may not include such torque limiters TL.

(6) In the above embodiment, an example is described in which the article support section 3 is a conveyor unit. However, the present invention is not limited to this example, and the article support section 3 may not have a function of transporting an article W. For example, the article support section 3 may be a stand or a frame that simply supports the article W.

(7) In the above embodiment, an example is described in which the article support section 3 is configured to indirectly support an article W via a container C. However, the present invention is not limited to this example, and the article support section 3 may be configured to directly support an article W.

(8) In the above embodiment, an example is described in which the second openings 120*a* are arranged at the same positions as the first openings 110*a* in the traveling direction X. However, the second openings 120*a* may be arranged at different positions than the first openings 110*a* in the traveling direction X.

(9) In the above embodiment, an example is described in which one end portion of the first transmission shaft Nb1 in the axial direction is provided with a coupling portion L that is for coupling to the first transmission shaft Nb1 provided in another frame unit 100 that is adjacent to the traveling direction X. However, the present invention is not limited to this example, and the frame unit 100 may not include such a coupling portion L. In this case, the other frame unit 100 may be independently provided with a first drive source M1 and independently open and close the first door members 111a. Similarly, the coupling portion L for coupling the second transmission shaft Nb2 to the second transmission shaft Nb2 of another frame unit 100 is also not essential.

(10) In the above embodiment, an example is described in which each frame unit 100 includes one first drive source M1. However, one frame unit 100 may include a plurality of first drive sources M1. Even in this case, the first drive sources M1 generate driving power for opening and closing the first door members 111a. This similarly applies to the second drive source M2.

(11) In the above embodiment, an example is described in which the second receiving area A2 is provided in addition to the first receiving area A1, the second receiving sections 120 are provided in addition to the first receiving sections 110, the second door members 121a are provided in addition to the first door members 111a, and the second door drive sections 121b are provided in addition to the first door drive sections 111b. However, the frame unit 100 is not limited to this example, and the frame unit 100 may not include the second receiving area A2, the second receiving section 120, the second door member 121a, or the second door drive section 121b.

(12) Note that the configurations disclosed in the above-described embodiments can be applied in combination with configurations disclosed in other embodiments as long as no contradiction arises. With respect to other configurations as well, the embodiments disclosed herein are merely exemplary in all respects. Accordingly, various modifications can be appropriately made without departing from the spirit of the present disclosure.

Overview of Embodiments

The following describes the frame unit described above.

A frame unit includes:
a top plate section;
a support leg section supporting the top plate section from below; and
an article support section configured to support an article, wherein the top plate section includes:
    a passage area provided with a passage along which an article transport vehicle is travelable, and
    a receiving area in which a plurality of receiving sections configured to receive the article from the article transport vehicle are provided,
each of the receiving sections includes an opening that passes through the top plate section in an up-down direction,
the article support section is configured to support, at a position below the top plate section, the article that was received by one of the receiving sections and passed through the opening of the one receiving section,
the frame unit further includes:
    a plurality of door members provided in correspondence with the openings, the door members each being configured to change in orientation between an open orientation in which the corresponding opening is open and a closed orientation in which the corresponding opening is closed; and
    a door drive section configured to drive the door members in order to cause the door members to change in orientation, and
the door drive section includes a drive source and a transmission mechanism configured to transmit driving power from the drive source to the plurality of door members.

According to this configuration, when a door member is in the closed orientation, the article received by the corresponding receiving section is placed on the door member. For this reason, one or more articles can accumulate on the door member. Then, when the door member is in the open orientation, the one or more articles placed on the door member pass through the opening and become supported by the article support section. For this reason, the frame unit having this configuration can be suitably used when sorting articles, for example. Also, according to this configuration, a plurality of the door members are provided in correspondence with a plurality of openings, and the door members are driven by the door drive section. The door drive section includes a drive source and a transmission mechanism that transmits driving power from the drive source to the door members, thus making it possible to drive a plurality of door members by one drive source. Therefore, according to this configuration, the number of drive sources can be lower than the number of door members, thus making it possible to commensurately reduce the amount of space required to dispose the drive sources, and reduce the size of the frame unit overall.

It is preferable that in the open orientation, the door members are each below the top plate section and overlapped with the passage area in a plan view.

According to this configuration, when in the open orientation, the door member can be stored by utilizing space that is below the top plate section and overlapped with the passage area in a plan view. This therefore makes it easier to reduce the size of the frame unit.

It is preferable that the plurality of receiving sections are arranged side by side along a traveling direction in which the article transport vehicle travels along the passage,
the door members are configured to change in orientation by sliding along a width direction that is orthogonal to the traveling direction in a plan view, and
the transmission mechanism includes:
    an output shaft configured to receive the driving power from the drive source,
    a transmission shaft interlocked with the output shaft and configured to receive the driving power output from the output shaft and transmit the driving power in the traveling direction,
    a plurality of driving members attached to the transmission shaft at positions in the traveling direction corresponding to the receiving sections arranged side by side in the traveling direction, and
    a plurality of driven members provided in correspondence with the plurality of door members, the driven members being fixed to the corresponding door members and configured to follow driving of the corresponding driving members.

According to this configuration, when the driven members are driven by the driving members, the door members to which the driven members are fixed can be caused to slide. Also, the transmission shaft is configured to receive driving power from the output shaft and transmit the driving power along the traveling direction, and the driven members are attached to the transmission shaft at positions in the traveling direction that correspond to the receiving sections arranged in the traveling direction, that is to say at positions corresponding to the door members. Therefore, according to this configuration, the plurality of door members arranged side by side along the traveling direction can be appropriately caused to slide by driving power from the drive source.

It is preferable that the receiving area being a first receiving area, the receiving sections being first receiving sections, the openings being first openings, the door members being first door members, the door drive section being a first door drive section, the drive source being a first drive source, the transmission mechanism being a first transmission mechanism, the output shaft being a first output shaft, the transmission shaft being a first transmission shaft, the driving members being first driving members, and the driven members being first driven members, the top plate section includes a second receiving area in which a plurality of second receiving sections configured to receive the article from the article transport vehicle are provided, in addition to the first receiving area, the first receiving area and the second receiving area are on opposite sides of the passage area in the width direction, each of the second receiving sections includes a second opening that passes through the top plate section in the up-down direction, the frame unit further includes:

a plurality of second door members provided in correspondence with the second openings, the second door members each being configured to change in orientation between an open orientation in which the corresponding second opening is open and a closed orientation in which the corresponding second opening is closed; and a second door drive section configured to drive the second door members in order to cause the second door members to change in orientation, the second door drive section includes a second drive source and a second transmission mechanism configured to transmit driving power from the second drive source to the plurality of second door members, the second transmission mechanism includes:

a second output shaft configured to receive the driving power from the second drive source, a second transmission shaft interlocked with the second output shaft and configured to receive the driving power output from the second output shaft and transmit the driving power in the traveling direction, a plurality of second driving members attached to the second transmission shaft at positions in the traveling direction corresponding to the second receiving sections arranged side by side in the traveling direction, and a plurality of second driven members provided in correspondence with the plurality of second door members, the second driven members being fixed to the corresponding second door members and configured to follow driving of the corresponding second driving members, the second openings are at positions identical to positions the first openings in the traveling direction, each of the first driven members is arranged side along the width direction, and each of the second driven members is arranged along the width direction, and while one first door member and one second door member arranged in correspondence with each other are both in the open orientation, the one first driven member and the one second driven member are at different positions from each other in the traveling direction and overlapped with each other along the traveling direction in a view along the traveling direction.

According to this configuration, the second openings are arranged at the same positions as corresponding first openings in the traveling direction. For this reason, the first door members that open and close the first openings and the second door members that open and close the second openings are arranged at the same positions in the traveling direction (arranged side by side in the width direction). This makes it possible to reduce the size of the frame unit in the traveling direction. In this configuration, when a first door member and a second door member that correspond to each other are both in the open orientation, the first driven member and the second driven member are located at different positions in the traveling direction and overlapped with each other along the traveling direction in a view along the traveling direction. Therefore, according to this configuration, the first door member and the second door member can be arranged at the same position in the traveling direction so as to reduce the size of the frame unit in the traveling direction, while also making it possible to prevent the first driven member fixed to the first door member and the second driven member fixed to the second door member from interfering with each other when both of the door members are in the open orientation.

It is preferable that the transmission shaft includes a coupling portion in an end portion of the transmission shaft along an axial direction, the coupling portion being configured to be coupled to a transmission shaft included in another frame unit at an adjacent position in the traveling direction.

According to this configuration, in the case where a plurality of frame units are arranged side by side along the traveling direction, driving power generated by one drive source can be transmitted to the transmission shafts of the frame units. Therefore, according to this configuration, the number of drive sources can be kept low, and it is possible to further reduce the size of the frame unit.

It is preferable that the frame unit further includes a torque limiter configured to limit torque transmitted through the transmission mechanism so as to not exceed a set value.

According to this configuration, even if excessive torque is generated in the transmission mechanism when a door member changes in orientation, it is possible to perform limiting to prevent torque that exceeds a set value from being transmitted by the transmission mechanism. Therefore, according to this configuration, it is possible to avoid a situation in which the transmission mechanism and the door members are damaged by excessive torque. Also, if excessive torque is generated due to an article becoming pinched between a door member and an opening for example, it is also possible to avoid damaging the article pinched between the door member and the opening.

It is preferable that the article support section is a conveyor unit configured to transport the article along a predetermined transport direction while the article is placed on the conveyor unit.

According to this configuration, the transport of an article can be divided into a stage in which the article is transported by the article transport vehicle and a stage in which the article is transported by the conveyor unit. In other words, articles transported to the receiving sections by the article transport vehicle can be transported by the conveyor unit. Accordingly, for example, articles can be sorted to corresponding receiving sections by the article transport vehicle, and then the sorted articles can be transported by the conveyor unit, and this frame unit can be suitably used for an article sorting facility or the like.

INDUSTRIAL APPLICABILITY

The technology according to the present disclosure is applicable to a frame unit that includes a top plate section, support leg sections that support the top plate section from below, and an article support section that supports an article.

The invention claimed is:

1. A frame unit comprising:
a top plate section;
a support leg section supporting the top plate section from below; and
an article support section configured to support an article, wherein the top plate section comprises:
a passage area provided with a passage along which an article transport vehicle is travelable, and
a receiving area in which a plurality of receiving sections configured to receive the article from the article transport vehicle are provided,
wherein:
each of the receiving sections includes an opening that passes through the top plate section in an up-down direction,
the article support section is configured to support, at a position below the top plate section, the article that was received by one of the receiving sections and passed through the opening of the one receiving section,
the frame unit further comprises:
a plurality of door members provided in correspondence with the openings, the door members each configured to change in orientation between an open orientation in which the corresponding opening is open and a closed orientation in which the corresponding opening is closed; and
a door drive section configured to drive the door members in order to cause the door members to change in orientation, and
the door drive section comprises a drive source and a transmission mechanism configured to transmit driving power from the drive source to the plurality of door members, and
in the open orientation, the door members are each below the top plate section and overlapped with the passage area in a plan view.

2. The frame unit according to claim 1, further comprising:
a torque limiter configured to limit torque transmitted through the transmission mechanism so as to not exceed a set value.

3. The frame unit according to claim 1,
wherein the article support section is a conveyor unit configured to transport the article along a predetermined transport direction while the article is placed on the conveyor unit.

4. A frame unit comprising:
a top plate section;
a support leg section supporting the top plate section from below; and
an article support section configured to support an article, wherein the top plate section comprises:
a passage area provided with a passage along which an article transport vehicle is travelable, and
a receiving area in which a plurality of receiving sections configured to receive the article from the article transport vehicle are provided,
wherein:
each of the receiving sections includes an opening that passes through the top plate section in an up-down direction,
the article support section is configured to support, at a position below the top plate section, the article that was received by one of the receiving sections and passed through the opening of the one receiving section,
the frame unit further comprises:
a plurality of door members provided in correspondence with the openings, the door members each configured to change in orientation between an open orientation in which the corresponding opening is open and a closed orientation in which the corresponding opening is closed; and
a door drive section configured to drive the door members in order to cause the door members to change in orientation, and
the door drive section comprises a drive source and a transmission mechanism configured to transmit driving power from the drive source to the plurality of door members,
the plurality of receiving sections is arranged side by side along a traveling direction in which the article transport vehicle travels along the passage,
the door members are configured to change in orientation by sliding along a width direction that is orthogonal to the traveling direction in a plan view, and
the transmission mechanism comprises:
an output shaft configured to receive the driving power from the drive source,
a transmission shaft interlocked with the output shaft and configured to receive the driving power output from the output shaft and transmit the driving power in the traveling direction,
a plurality of driving members attached to the transmission shaft at positions in the traveling direction corresponding to the receiving sections arranged side by side in the traveling direction, and
a plurality of driven members provided in correspondence with the plurality of door members, the driven members fixed to the corresponding door members and configured to follow driving of the corresponding driving members.

5. The frame unit according to claim 4, wherein:
the receiving area is a first receiving area, the receiving sections are first receiving sections, the openings are first openings, the door members are first door members, the door drive section is a first door drive section, the drive source is a first drive source, the transmission mechanism is a first transmission mechanism, the output shaft is a first output shaft, the transmission shaft is a first transmission shaft, the driving members are first driving members, and the driven members are first driven members,
the top plate section includes a second receiving area in which a plurality of second receiving sections configured to receive the article from the article transport vehicle are provided, in addition to the first receiving area,
the first receiving area and the second receiving area are on opposite sides of the passage area in the width direction,
each of the second receiving sections includes a second opening that passes through the top plate section in the up-down direction,
the frame unit further comprises:
a plurality of second door members provided in correspondence with the second openings, the second door members each configured to change in orientation between an open orientation in which the corresponding second opening is open and a closed orientation in which the corresponding second opening is closed; and a second door drive section configured to drive the second door members in order to cause the second door members to change in orientation, the second door drive section comprises a second drive source and a second transmission mechanism configured to transmit driving power from the second drive source to the plurality of second door members, the second transmission mechanism comprises:

a second output shaft configured to receive the driving power from the second drive source, a second transmission shaft interlocked with the second output shaft and configured to receive the driving power output from the second output shaft and transmit the driving power in the traveling direction, a plurality of second driving members attached to the second transmission shaft at positions in the traveling direction corresponding to the second receiving sections arranged side by side in the traveling direction, and a plurality of second driven members provided in correspondence with the plurality of second door members, the second driven members fixed to the corresponding second door members and configured to follow driving of the corresponding second driving members, the second openings are at positions identical to positions the first openings in the traveling direction, each of the first driven members is arranged along the width direction, and each of the second driven members is arranged along the width direction, and while one first door member and one second door member arranged in correspondence with each other are both in the open orientation, the one first driven member and the one second driven member are at different positions from each other in the traveling direction and overlapped with each other along the traveling direction in a view along the traveling direction.

6. The frame unit according to claim 4, wherein the transmission shaft comprises a coupling portion in an end portion of the transmission shaft along an axial direction, the coupling portion configured to be coupled to a transmission shaft in another frame unit at an adjacent position in the traveling direction.

7. The frame unit according to claim 4, further comprising:

a torque limiter configured to limit torque transmitted through the transmission mechanism so as to not exceed a set value.

8. The frame unit according to claim 4, wherein the article support section is a conveyor unit configured to transport the article along a predetermined transport direction while the article is placed on the conveyor unit.

* * * * *